United States Patent
Xu

(10) Patent No.: US 12,501,429 B2
(45) Date of Patent: Dec. 16, 2025

(54) INFORMATION TRANSMISSION METHOD AND APPARATUS, AND NETWORK DEVICE

(71) Applicant: GUANGDONG OPPO MOBILE TELECOMMUNICATIONS CORP., LTD., Dongguan (CN)

(72) Inventor: Yang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 245 days.

(21) Appl. No.: 17/516,357

(22) Filed: Nov. 1, 2021

(65) Prior Publication Data
US 2022/0061075 A1  Feb. 24, 2022

Related U.S. Application Data

(63) Continuation of application No. PCT/CN2019/085902, filed on May 7, 2019.

(51) Int. Cl.
*H04W 72/1273* (2023.01)
*H04W 72/23* (2023.01)
*H04W 76/28* (2018.01)
*H04W 88/10* (2009.01)
*H04W 68/00* (2009.01)

(52) U.S. Cl.
CPC ........ *H04W 72/1273* (2013.01); *H04W 72/23* (2023.01); *H04W 76/28* (2018.02); *H04W 88/10* (2013.01); *H04W 68/005* (2013.01)

(58) Field of Classification Search
CPC .............. H04W 68/005; H04W 72/23; H04W 72/1273; H04W 76/16; H04W 76/19; H04W 76/25; H04W 76/30; H04W 88/10

USPC .......................................... 370/252, 328, 329
See application file for complete search history.

(56) References Cited

U.S. PATENT DOCUMENTS

| | | | |
|---|---|---|---|
| 9,992,802 B2 | 6/2018 | Lee et al. | |
| 2018/0279411 A1* | 9/2018 | Kang | ...... H04W 76/30 |
| 2019/0116546 A1 | 4/2019 | Kang et al. | |
| 2019/0394711 A1* | 12/2019 | Kim | ...... H04W 76/25 |

(Continued)

FOREIGN PATENT DOCUMENTS

| | | |
|---|---|---|
| CN | 101645824 A | 2/2010 |
| CN | 103582011 A | 2/2014 |
| CN | 109104773 A | 12/2018 |

(Continued)

OTHER PUBLICATIONS

CN109429366_Machine translation (Year: 2019).*

(Continued)

*Primary Examiner* — Harun Chowdhury
(74) *Attorney, Agent, or Firm* — BAYES PLLC

(57) ABSTRACT

Provided are an information transmission method and a device. The method includes receiving, by a first core network element, a first message. The first message is used to notify the first core network element that a N3GPP access is unavailable or that a terminal is in an idle state over the N3GPP access. If there is downlink data arriving at the first core network element, the method further includes transmitting, by the first core network element, the downlink data via a 3GPP access, discarding the downlink data, or delaying transmission of the downlink data.

4 Claims, 11 Drawing Sheets

(56) References Cited

U.S. PATENT DOCUMENTS

2020/0015309 A1* 1/2020 Li .................. H04W 76/19

FOREIGN PATENT DOCUMENTS

| CN | 109246821 A | | 1/2019 |
|---|---|---|---|
| CN | 109429366 A | * | 3/2019 |
| CN | 109673060 A | | 4/2019 |
| WO | 2018175000 A1 | | 9/2018 |
| WO | 2019076275 A1 | | 4/2019 |
| WO | 2019076306 A1 | | 4/2019 |
| WO | WO-2020166880 A1 | * | 8/2020 |

OTHER PUBLICATIONS

WO2020166880_Machine Translation (Year: 2020).*

Second Office Action issued in corresponding European application No. 19928180.9, mailed Feb. 16, 2023.

Extended European Search Report issued in corresponding European Application No. 19928180.9 mailed Mar. 11, 2022, 6 pages.

The First Office Action issued in corresponding Chinese Application No. 202010674534.8, mailed May 16, 2022, 21 pages.

Notice of Priority Review of Patent Application issued in corresponding Chinese Application No. 202010674534.8, mailed May 6, 2022, 6 pages.

"23.793: Proposed Solution for Multi-access PDU Session", Agenda Item: 6.8, Source: ETRI, SA WG2 Meeting #126, S2-182123, Feb. 26-Mar. 2, 2018, Montreal, Canada, 8 pages.

"Conclusion on Key Issue #6 3GPP RAT differentiation", Agenda Item: 6.8 Study on Access Traffic Steering, Switch and Splitting support in the 5G system architecture, Source: LG Electronics, 3GPP TSG-SA WG2 Meeting #129bis, S2-1812141, West Palm Beach, USA, Nov. 26-30, 2018 (revision, 4 pages.

"Solution 2 Update: Modifying Multi-access PDU Session as single-access PDU", Agenda Item: 6.8, Source: InterDigital Inc., SA WG2 Meeting #127-bis, S2-184829, May 28-Jun. 1, 2018, Newport Beach, USA, 2 pages.

"TS 23.502 NW Triggered service request for N3GPP PDU session over 3GPP access", Agenda Item: 6.5.10, Source: ETRI, SA WG2 Meeting #123, S2-177391, Jun. 26-30, 2017 Ljubljana, Slovenia, 12 pages.

Second Office Action issued in corresponding Chinese application No. 202010674534.8, mailed Jul. 14, 2022.

First Office Action issued in corresponding European application No. 19928180.9, mailed Sep. 5, 2022.

International Search Report issued in corresponding International Application No. PCT/CN2019/085902, mailed Jan. 10, 2020, 33 pages.

PCT Written Opinion of the International Searching Authority issued in corresponding International Application No. PCT/CN2019/085902, mailed Jan. 10, 2020, 9 pages.

* cited by examiner

INFORMATION TRANSMISSION METHOD AND APPARATUS, AND NETWORK DEVICE

CROSS-REFERENCE TO RELATED APPLICATION

This application is a continuation of International Application No. PCT/CN2019/085902, filed on May 7, 2019, the entire contents of which are hereby incorporated by reference.

BACKGROUND

Embodiments of the present disclosure generally relate to mobile communication technologies, and more particularly, to an information transmission method and device and a network device.

In 5G networks, a Protocol Data Unit (PDU) session can use multiple access technologies to transmit data. For example, the 3rd Generation Partnership Project (3GPP) access technology and non-3GPP (N3GPP) access technology may be used at the same time to transmit data. This PDU session is called Multi-Access PDU Session (MA PDU session).

Currently, there is a lack of a complete mechanism for managing user plane data transmission for MA PDU session.

SUMMARY

Embodiments of the present disclosure provide an information method and device and a network device.

An information transmission method according to an embodiment of the present disclosure includes receiving, by a first core network element, a first message, wherein the first message is used to notify the first core network element that a N3GPP access is unavailable or that a terminal is in an idle state over the N3GPP access; and if there is downlink data arriving at the first core network element, transmitting, by the first core network element, the downlink data via a 3GPP access, or discarding the downlink data, or delaying transmission of the downlink data.

An information transmission method according to an embodiment of the present disclosure includes, if there is downlink data arriving at a first core network element, determining, by the first core network element, whether to transmit the downlink data via a N3GPP access or a 3GPP access; and if it is determined to transmit the downlink data via the N3GPP access, transmitting, by the first core network element, the downlink via the N3GPP access.

An information transmission device according to an embodiment of the present disclosure is applied to a first network element. The device includes a receiving unit configured to receive a first message, wherein the first message is used to notify the first core network element that a N3GPP access is unavailable or that a terminal is in an idle state over the N3GPP access; and a process unit configured to, if there is downlink data arriving at the first core network element, transmit the downlink data via a 3GPP access, or discarding the downlink data, or delaying transmission of the downlink data.

An information transmission device according to an embodiment of the present disclosure is applied to a first network element. The device includes a determination unit configured to, if there is downlink data arriving at a first core network element, determine whether to transmit the downlink data via a N3GPP access or a 3GPP access; and a transmission unit configured to, if it is determined to transmit the downlink data via the N3GPP access, transmit the downlink via the N3GPP access.

A network device according to an embodiment of the present disclosure includes a processor and a memory. The memory is configured to store a computer program. The processor is configured to call and run the computer program stored in the memory to perform the above information transmission methods.

A chip according an embodiment of the present disclosure is configured to perform the above information transmission methods.

Specifically, the chip includes a processor configured to call and run a computer program from a memory to cause a device installed with the chip to perform the above information transmission methods.

A computer-readable storage medium according to an embodiment of the present disclosure is configured to store a computer program that causes a computer to perform the above information transmission methods.

A computer program product according to an embodiment of the present disclosure includes computer program instructions that cause a computer to perform the above information transmission methods.

A computer program according to an embodiment of the present disclosure, when run on a computer, causes the computer to perform the above information transmission methods.

In the above technical solutions, on the one hand, when the N3GPP access is unavailable or the terminal is in the idle state over the N3GPP access, the user plane resources corresponding to the N3GPP access is not activated, but the downlink data is transmitted via the 3GPP access or the downlink data is discarded or transmission of downlink data is delayed. On the other hand, when the N3GPP access is unavailable or the terminal is in the idle state over the N3GPP access, the network triggered service request procedure is completed via the N3GPP access, and then the downlink data is transmitted via the N3GPP access. In this way, the access type (i.e. the 3GPP access or the N3GPP access) required for user plane data transmission is clarified, and the user plane resources corresponding to the required access type are activated.

BRIEF DESCRIPTION OF THE DRAWINGS

The drawings herein are used to provide a further understanding of the present disclosure and constitute a part of the present disclosure. The exemplary embodiments are used to explain the present disclosure, and do not constitute an improper limitation of the present disclosure.

DETAILED DESCRIPTION

Technical solutions in embodiments of the present disclosure will be described below with reference to the drawings. Obviously, the described embodiments are a part of the embodiments of the present disclosure, not all of the embodiments. Based on the embodiments in the present disclosure, all other embodiments obtained by those of ordinary skill in the art without creative work shall fall within the protection scope of the present disclosure.

The technical solutions of embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system or a 5G system, etc.

Figure 1:
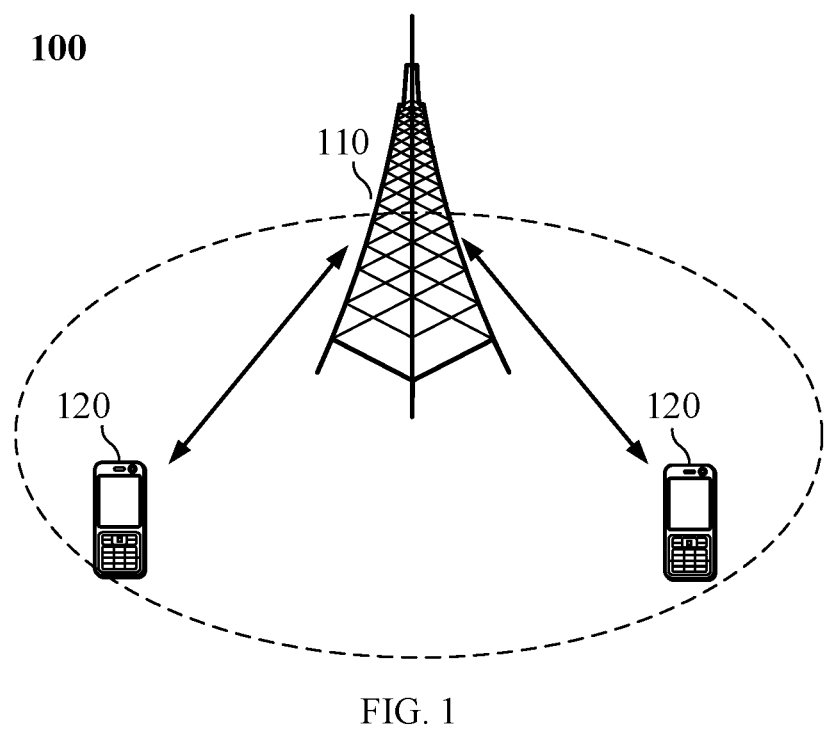
FIG. 1 is a schematic diagram of a communication system architecture according to an embodiment of the present disclosure.

Exemplarily, the communication system 100 applied in embodiments of the present disclosure is shown in FIG. 1. The communication system 100 may include a network device 110, and the network device 110 may be a device that communicates with a terminal 120 (or called a communication terminal or terminal). The network device 110 may provide communication coverage for a specific geographic area, and may communicate with terminals in the coverage area. According to embodiments, the network device 110 may be a base station (Base Transceiver Station, BTS) in a GSM system or a CDMA system, or a base station (NodeB, NB) in a WCDMA system, or an evolved base station in an LTE system (Evolutional Node B, eNB or eNodeB), or a wireless controller in a Cloud Radio Access Network (CRAN), or the network device can be a mobile switching center, a relay station, an access point, a vehicle-mounted device, a wearable device, a hub, a switch, a bridge, a router, a network-side device in 5G networks or a network device in the future evolved Public Land Mobile Network (PLMN), etc.

The communication system 100 also includes at least one terminal 120 within the coverage area of the network device 110. The "terminal" as used herein may be connected in the following manners (including but not limited to): the terminal may be connected via wired lines, such as via Public Switched Telephone Networks (PSTN), Digital Subscriber Line (DSL), digital cables, and direct cable connections; and/or the terminal may be connected via another data connection/network; and/or the terminal may be connected via a wireless interface, such as cellular networks, wireless local area network (WLAN), digital TV networks such as DVB-H networks, satellite networks, AM-FM A broadcast transmitter; and/or the terminal is connected via a device of another terminal which is configured to receive/send communication signals; and/or the terminal device is connected via an Internet of Things (IoT) device. A terminal set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable devices, a terminal in 5G networks, or a terminal in the future evolved PLMN, etc.

According to embodiments, Device to Device (D2D) communication may be performed between the terminals 120.

According to embodiments, the 5G system or 5G network may also be referred to as a New Radio (NR) system or NR network.

FIG. 1 exemplarily shows one network device and two terminals. According to other embodiments, the communication system 100 may include multiple network devices and the coverage of each network device may include other numbers of terminals, and embodiments of the present disclosure do not impose specific limitations on this.

According to embodiments, the communication system 100 may also include other network entities such as a network controller and a mobility management entity, and embodiments of the present disclosure do not impose specific limitations on this.

It should be understood that the devices with communication functions in the network/system in embodiments of the present disclosure may be referred to as communication devices. Taking the communication system 100 shown in FIG. 1 as an example, the communication devices may include the network device 110 and the terminals 120 with communication functions, and the network device 110 and the terminals 120 may be the devices described above, which will not be repeated here. The communication devices may also include other devices in the communication system 100, such as other network entities such as a network controller or a mobility management entity, and embodiments of the present disclosure do not impose specific limitations on this.

It should be understood that the terms "system" and "network" are often used interchangeably herein. The term "and/or" is an association relationship between associated objects, which means that there can be three relationships, for example, A and/or B can mean: A exists alone, both A and B exist, B exists alone. In addition, the character "/" generally indicates that the associated objects before and after "/" are in an "or" relationship.

To facilitate the understanding of the technical solutions of embodiments of the present disclosure, the following describes the technologies related to the embodiments of the present disclosure.

MA PDU Session. A PDU Session can use multiple access technologies to transmit data. This PDU Session is called an MA PDU session. By the MA PDU Session, terminals can obtain a higher transmission rate and save more charges; networks can use N3GPP wireless resources more efficiently and increase the transmission rate.

Figure 2:
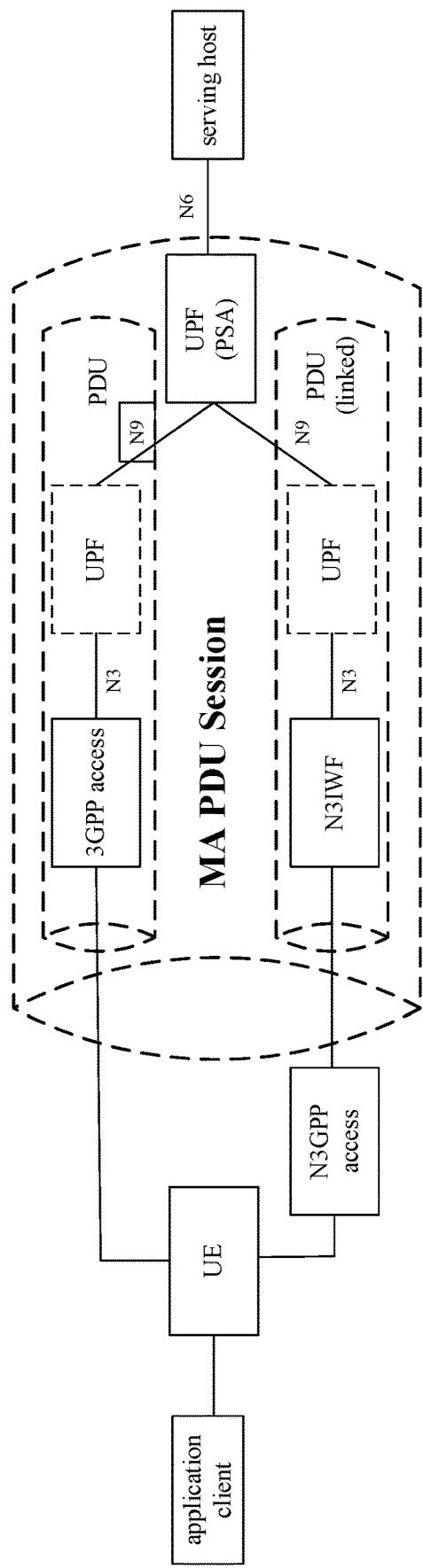
FIG. 2 is a schematic diagram of a MA PDU session according to an embodiment of the present disclosure.

FIG. 2 is a schematic diagram of the MA PDU session. The MA PDU session can be transmitted via a 3GPP access or via a N3GPP access. The N3GPP needs to access the core network through an N3GPP InterWorking Function (N3IWF). In an example, the 3GPP access may be a 4G access or a 5G access. The N3GPP can be a Wireless Local Area Network (WLAN) access or a WiFi access.

For the ordinary PDU session established only over the N3GPP access, after a UE enters the idle state over the N3GPP access, when downlink data arrives at the User Plane Function (UPF), the UPF informs the Session Management Function (SMF). In non-roaming mode and Local Breakout roaming mode, this UPF is PDU Session Anchor (PSA) UPF; in home routed roaming mode, this UPF is V-UPF. The SMF is the SMF that manages the UPF. SMF then notifies the Access and Mobility Management Function (AMF). The AMF cannot page the UE via the N3GPP access, but can only notify the UE via the 3GPP access. Here, there are two ways to notify the UE: 1) if the UE is in the idle state over the 3GPP access, the AMF pages the UE via the 3GPP access; 2) if the UE is in the connected state over the 3GPP access, the AMF sends a notification message to the UE via the 3GPP access. When the UE receives the notification over the 3GPP access, the UE can transfer the PDU session to the 3GPP access, and establish corresponding user plane resources over the 3GPP access, such as Uu interface resources and N3 interface resources.

Figure 3:
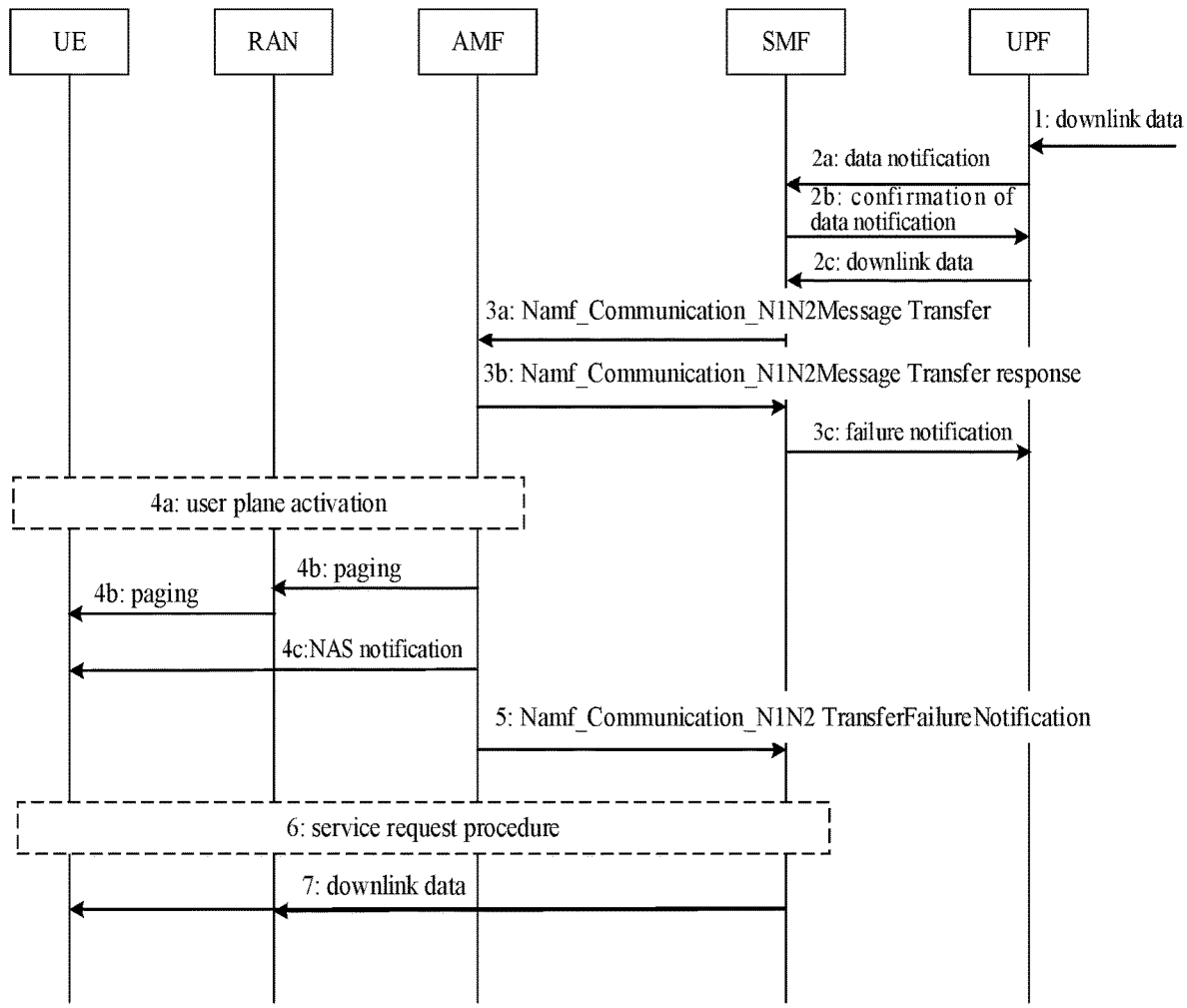
FIG. 3 is a schematic diagram showing processes of a network triggered service request procedure according to an embodiment of the present disclosure.

Network Triggered Service Request Procedure. FIG. 3 is a schematic diagram showing processes of a network triggered service request procedure. As show in FIG. 3, the procedure includes the following steps.

In step 1, downlink Data reaches UPF. In the non-roaming mode and the Local Breakout roaming mode, this UPF is PSA UPF. In the home routed roaming mode, this UPF is V-UPF.

In step 2a, the UPF sends a Data Notification message to the SMF. The SMF is the SMF that manages the UPF.

In step 2b, the SMF sends a Data Notification Ack message to the UPF.

In step 2c, the UPF sends downlink data to the SMF.

In step 3a, the SMF sends a Namf_Communication_N1N2Message Transfer message to the AMF.

In step 3b, the AMF sends a Namf_Communication_N1N2Message Transfer response message to the SMF.

In step 3c, the SMF sends a failure indication to the UPF.

In step 4a, user plane (UP) reactivation is performed between the AMF and the UE.

In step 4b, the AMF initiates paging to the UE via a Radio Access Network (RAN).

In step 4c, the AMF sends a non-access stratum (NAS) notification message to the UE.

In step 5, the AMF sends a Namf_Communication_N1N2 TransferFailureNotification message to the SMF.

In step 6, the UE and the network perform the service request procedure.

In step 7, the UPF sends downlink data to the UE via RAN.

It should be noted that one of the above-mentioned steps 4b and 4c can be performed. Specifically, when the UE is in an idle state, step 4b is performed; when the UE is in a connected state, step 4c is performed.

Figure 4:
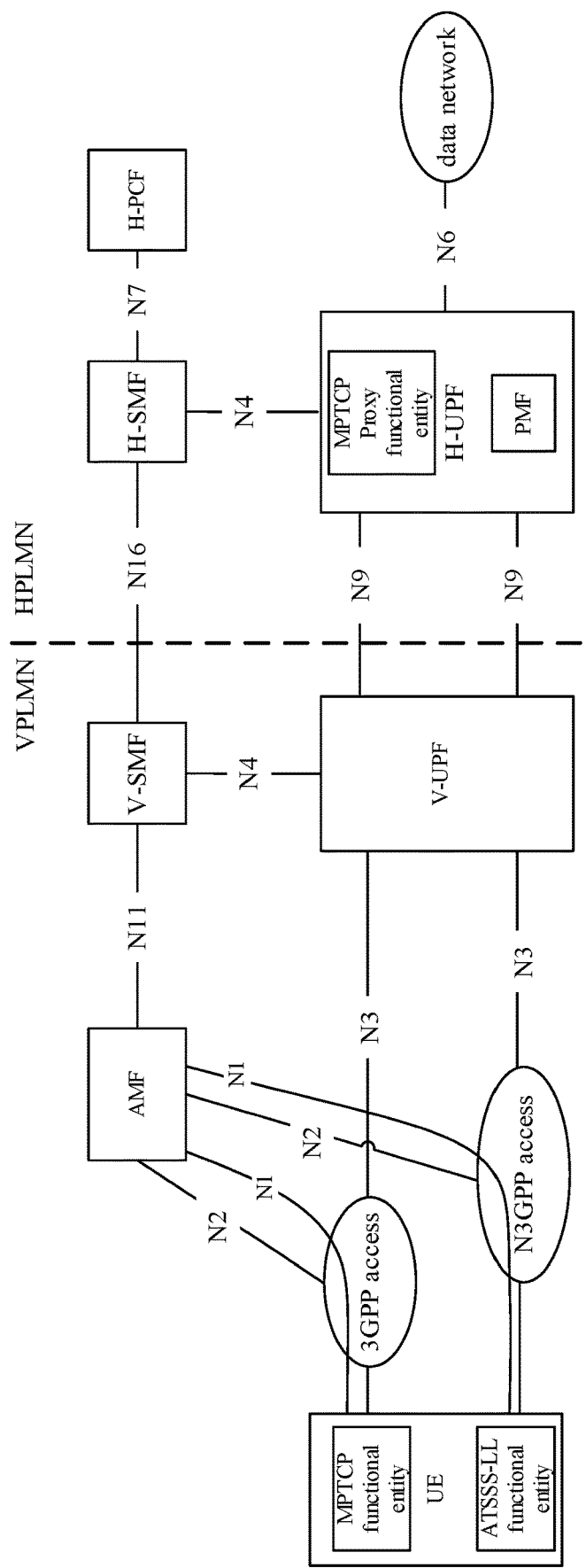
FIG. 4 is a schematic diagram of MA-PDU session in a home routed roaming scenario according to an embodiment of the present disclosure.

Roaming Scenario. FIG. 4 is a possible schematic diagram of the MA-PDU session in the home routed roaming scenario. In FIG. 4, the SMF and UPF in the visited network near the UE are called Visited-SMF (V-SMF) and Visited-UPF (V-UPF). The SMF and UPF in the home network far away from the UE are called Home-SMF (H-SMF) and Home-UPF (H-UPF). H-UPF is also a PSA UPF because it is a node connected to external data networks. Compared with the non-roaming scenario, V-SMF and V-UPF are inserted in the home routed roaming scenario, and the previous SMF and UPF of the non-roaming scenario become H-SMF and H-UPF.

At present, there is a lack of a complete mechanism for managing user plane data transmission for the MA PDU session for the non-roaming scenario and the roaming scenario. For this reason, the following technical solutions of embodiments of the present disclosure are proposed.

Figure 5:
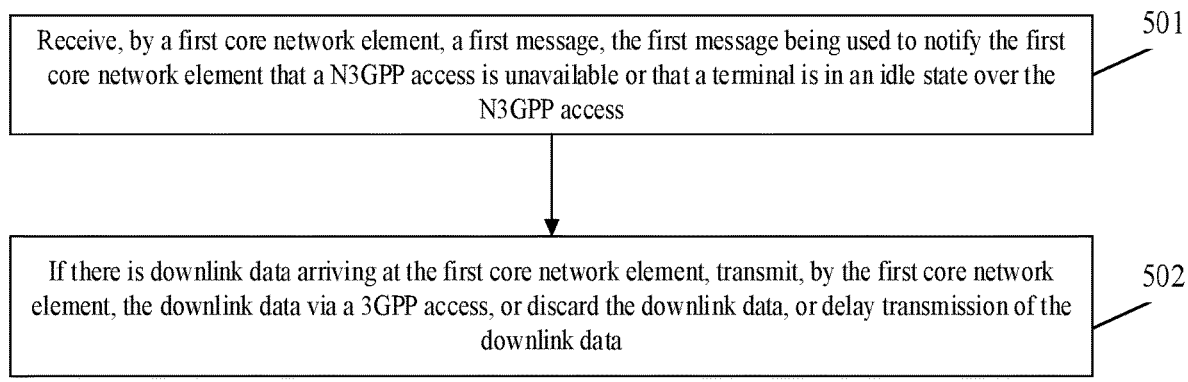
FIG. 5 is a flowchart of an information transmission method according to an embodiment of the present disclosure.

FIG. 5 is a schematic diagram showing processes of an information transmission method according to an embodiment of the present disclosure. As shown in FIG. 5, the information transmission method includes the following steps.

In step 501, a first core network element receives a first message. The first message is used to notify the first core network element that a N3GPP access is unavailable or that a terminal is in an idle state over the N3GPP access.

In embodiments of the present disclosure, the first core network element receiving the first message may be implemented using the following methods. It should be noted that the first core network element is a first UPF.

Method 1: The first message is sent to the first UPF by the terminal. Here, the first UPF is PSA UPF.

Method 2: The first message is sent to the first UPF by the first SMF.

In the non-roaming scenario, the first UPF is PSA UPF, and the first SMF is H-SMF. Before the first message is sent by the first SMF to the first UPF, the AMF notifies the first SMF that the terminal is in the idle state over the N3GPP access.

In the local breakout roaming scenario, the first UPF is PSA UPF, and the first SMF is V-SMF. Before the first message is sent by the first SMF to the first UPF, the AMF notifies the first SMF that the terminal is in the idle state over the N3GPP access.

In the home routed roaming scenario, the first UPF is H-UPF, the first SMF is H-SMF, the second UPF is V-UPF, and the second SMF is V-SMF. Before the first message is sent by the first SMF to the first UPF, the AMF notifies the second SMF that the terminal is in the idle state over the N3GPP access; the second SMF notifies the first SMF that the terminal is in the idle state over the N3GPP access.

In step 502, if there is downlink data arriving at the first core network element, the first core network element transmits the downlink data via a 3GPP access, or discards the downlink data, or delays transmission of the downlink data.

In embodiments of the present disclosure, if downlink data reaches the first core network element, the first core network element determines, based on a first policy, whether to transmit the downlink data via the 3GPP access or discard the downlink data, or delay the transmission of the downlink data.

In an embodiment, the first policy comes locally from the first core network element. In another embodiment, the first policy comes from PCF. For example, when the MA PDU session is established or modified, the PCF sends the first policy to the SMF, and the SMF sends the first policy to the UPF.

If the first core network element transmits the downlink data via the 3GPP access, a user plane resource corresponding to the 3GPP access need to be activated. The following describes how to activate the user plane resource corresponding to the 3GPP access in different scenarios.

In a non-roaming scenario, the first UPF is PSA UPF, and the first SMF is H-SMF. 1) If the user plane resource corresponding to the 3GPP access is deactivated, the first UPF sends a downlink data notification message to the first SMF, and the downlink data notification message carries a first session identifier; the first SMF determines, based on the first session identifier in the downlink data notification message, that the user plane resource corresponding to the 3GPP access needs to be activated; 2) the first SMF sends a second message (such as the N1N2Message Transfer message) to the AMF, and the second message carries the first session identifier; the AMF determines, based on the first session identifier in the second message, that it is needed to perform a service request procedure via the 3GPP access; 3) after the service request procedure is completed, the first UPF sends the downlink data to the terminal via the 3GPP access. It should be noted that the first session identifier refers to the session identifier corresponding to the downlink data to be transmitted.

In the home routed roaming scenario, the first UPF is H-UPF, the first SMF is H-SMF, the second UPF is V-UPF, and the second SMF is V-SMF. 1) The first UPF sends the downlink data to the second UPF; 2) if the user plane resource corresponding to the 3GPP access is deactivated, the second UPF sends a downlink data notification message to the second SMF, and the downlink data notification message carries the first session identifier; the second SMF determines, based on the first session identifier in the downlink data notification message, that the user plane resource corresponding to the 3GPP access needs to be activated; 3) the second SMF sends the second message (such as the N1N2Message Transfer message) to the AMF, and the second message carries the first session identifier; the AMF determines, based on the first session identifier in the second message, that the service request procedure needs to be performed via the 3GPP access; 4) after the service request procedure is completed, the second UPF sends the downlink data to the terminal via the 3GPP access. It should be noted that the first session identifier refers to the session identifier corresponding to the downlink data to be transmitted.

In embodiments of the present disclosure, after the terminal enters the connected state over the N3GPP access, the first core network element is notified in the following manner: the first core network element receives a third message, and the third message is used to notify the first core network element that the N3GPP access is available or the terminal is in a connected state over the N3GPP access.

In embodiments of the disclosure, the first core network element receiving the third message may be implemented using at least one of the following methods.

Method 1: The third message is sent by the terminal to the first UPF. Here, the first UPF is PSA UPF.

Method 2: The third message is sent to the first UPF by the first SMF.

In the non-roaming scenario, the first UPF is PSA UPF, and the first SMF is H-SMF. Before the third message is sent by the first SMF to the first UPF, the AMF notifies the first SMF that the terminal is in the connected state over the N3GPP access.

In the local breakout roaming scenario, the first UPF is PSA UPF, and the first SMF is V-SMF. Before the third message is sent by the first SMF to the first UPF, the AMF notifies the first SMF that the terminal is in the connected state over the N3GPP access.

In the home routed roaming scenario, the first UPF is H-UPF, the first SMF is H-SMF, the second UPF is V-UPF, and the second SMF is V-SMF. Before the third message is sent by the first H-SMF to the first UPF, the AMF notifies the second SMF that the terminal is in the connected state over the N3GPP access; the second SMF notifies the first SMF that the terminal is in the connected state over the N3GPP access.

The following describes detailed processes of the above technical solutions.

Figure 6:
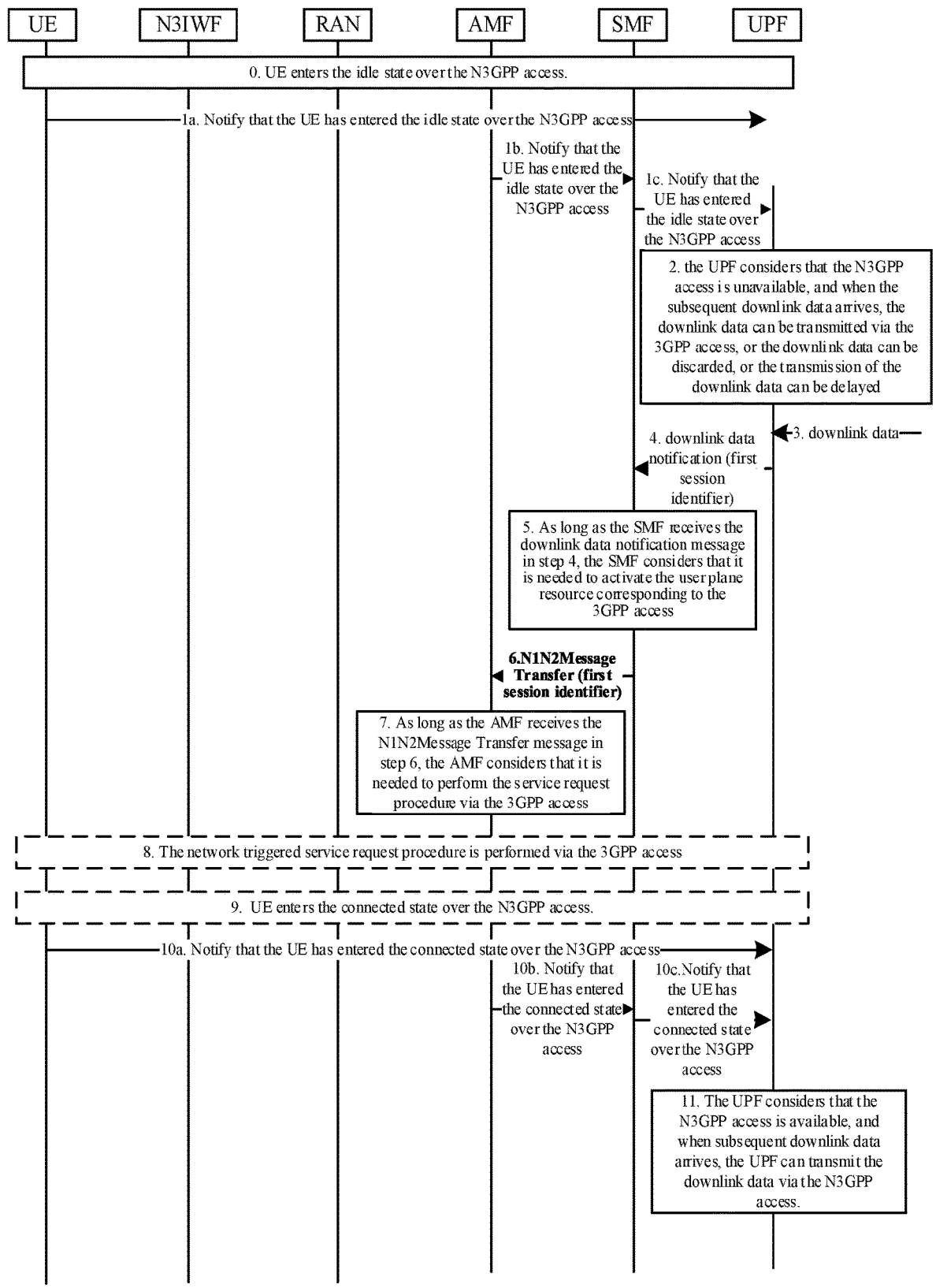
FIG. 6 is a schematic diagram showing processes of an information transmission method according to an embodiment of the present disclosure.

FIG. 6 is a schematic diagram showing processes of an information transmission method according to an embodiment of the present disclosure. As shown in FIG. 6, the information transmission method includes the following steps.

In step 0, a UE enters the idle state over the N3GPP access.

The UE is registered with the core network via the 3GPP access and the N3GPP access in advance, and can be registered with the same Public Land Mobile Network (PLMN) or different PLMNs: for the same PLMN, there is only one AMF; for different PLMNs, each access corresponds to an AMF.

In step 1a, the UE sends a notification to the UPF. The notification is used to notify that the UE has entered the idle state over the N3GPP access.

Here, the notification can be carried in a message, or it can be a message. The message may be an Access Availability Report message.

For the non-roaming scenario, the UPF is H-UPF.

For the home routed roaming scenario, the UPF is H-UPF, and the UE and the H-UPF can interact via respective Performance Measurement Function (PMF), and the interactive information is transmitted using the user plane.

In step 1b, the AMF sends a notification to the SMF, and the notification is used to notify that the UE has entered the idle state over the N3GPP access.

Here, the AMF to which the UE is registered via the N3GPP knows that the UE has entered the idle state, and the AMF notifies the SMF that the UE has entered the idle state over the N3GPP access.

For the non-roaming scenario, the SMF is H-SMF.

For the home routed roaming scenario, the SMF is V-SMF.

In step 1c, The SMF sends a notification to the UPF, and the notification is used to notify that the UE has entered the idle state over the N3GPP access.

For the non-roaming scenario, the SMF is H-SMF and the UPF is H-UPF.

For the home routed roaming scenario, the SMF is V-SMF, the V-SMF informs the H-SMF that the UE enters the idle state over the N3GPP access, and the H-SMF then informs the H-UPF that UE enters the idle state over the N3GPP access.

It should be noted that by the above step 1*a*, the UPF can learn that the N3GPP access is not available or the terminal is in the idle state over the N3GPP access. By the above steps (1*b*+1*c*), the UPF can also learn that the N3GPP access is unavailable or the terminal is in the idle state over the N3GPP access. One of step 1*a* and step (1*b*+1*c*) can be performed, or both steps can be performed.

In step 2, the UPF considers that the N3GPP access is unavailable, and when the subsequent downlink data arrives, the downlink data can be transmitted via the 3GPP access, or the downlink data can be discarded, or the transmission of the downlink data can be delayed.

Here, which action the UPF performs can be determined according to a local policy or according to a policy from the PCF. For example, when the MA PDU session is established or modified, the PCF sends the policy to the SMF, and the SMF sends the policy to the UPF.

For the non-roaming scenario, the UPF is H-UPF.

For the home routed roaming scenario, the UPF is H-UPF.

In step 3, the downlink data reaches UPF.

For the non-roaming scenario, the UPF is H-UPF.

For the home routed roaming scenario, the UPF is V-UPF. Specifically, the downlink data reaches the H-UPF first, and the H-UPF forwards the downlink data to the V-UPF, so that the downlink data reaches the V-UPF.

In step 4, the UPF sends a downlink data notification message to the SMF. The downlink data notification message carries the first session identifier (that is, the session identifier corresponding to the downlink data).

Here, when the UPF determines that the downlink data is transmitted via the 3GPP access, if the user plane resource corresponding to the 3GPP access is deactivated, the UPF sends a downlink data notification message to the SMF, and the downlink data notification message includes the first session identifier.

For the non-roaming scenario, the UPF is H-UPF and the SMF is H-SMF.

For the home routed roaming scenario, the UPF is V-UPF and the SMF is V-SMF.

In step 5, as long as the SMF receives the downlink data notification message in step 4, the SMF considers that it is needed to activate the user plane resource corresponding to the 3GPP access.

Here, the SMF knows that it is an MA PDU session according to the first session identifier in the downlink data notification message, and the SMF knows that it is needed to activate the user plane resource corresponding to the 3GPP access.

For the non-roaming scenarios, the SMF is H-SMF.

For the home routed roaming scenario, the SMF is V-SMF.

In step 6, the SMF sends an N1N2Message Transfer message to the AMF, and the N1N2Message Transfer message carries the first session identifier.

Here, the N1N2Message Transfer message also includes the N2 SM Message sent to the RAN.

For the non-roaming scenario, the SMF is H-SMF.

For the home routed roaming scenario, the SMF is V-SMF.

In step 7, as long as the AMF receives the N1N2Message Transfer message in step 6, the AMF considers that it is needed to perform the service request procedure via the 3GPP access.

Here, the AMF knows that it is an MA PDU Session according to the first session identifier in the N1N2Message Transfer message, and then performs the service request procedure via the 3GPP access.

In step 8, the network triggered service request procedure is performed via the 3GPP access.

In step 9, the UE enters the connected state over the N3GPP access.

In step 10*a*, the UE sends a notification to the UPF. The notification is used to notify that the UE has entered the connected state over the N3GPP access.

Here, the notification can be carried in a message or can be a message. The message may be an Access Availability Report message.

For the non-roaming scenario, the UPF is H-UPF.

For the home routed roaming scenario, the UPF is H-UPF, and the UE and the H-UPF can interact via respective Performance Measurement Function (PMF), and the interactive information is transmitted using the user plane.

In step 10*b*, the AMF sends a notification to the SMF, which is used to notify the UPF that the UE has entered the connected state over the N3GPP access.

Here, the AMF registered through N3GPP knows that the UE has entered the connected state, and the AMF notifies the SMF that the UE has entered the connected state over the N3GPP access.

For the non-roaming scenarios, the SMF is H-SMF.

For the home routed roaming scenario, the SMF is V-SMF.

In step 10*c*, the SMF sends a notification to the UPF, and the notification is used to notify the UPF that the UE has entered the connected state over the N3GPP access.

For the non-roaming scenario, the SMF is H-SMF and the UPF is H-UPF.

For the home routed roaming scenario, the SMF is V-SMF, the V-SMF informs the H-SMF that the UE enters the connected state over the N3GPP access, and the H-SMF then informs the H-UPF that the UE enters the connected state over the N3GPP access.

It should be noted that by the above step 10*a*, the UPF can learn that the N3GPP access is available or the terminal is in the connected state over the N3GPP access. By the above steps (10*b*+10*c*), the UPF can learn that the N3GPP access is available or that the terminal is in the connected state over the N3GPP access. One or both of step 10*a* and steps (10*b*+10*c*) can be performed.

In step 11, the UPF considers that the N3GPP access is available, and when subsequent downlink data arrives, the UPF can transmit the downlink data via the N3GPP access.

For the non-roaming scenario, the UPF is H-UPF.

For the home routed roaming scenario, the UPF is H-UPF.

In the technical solutions of embodiments of the present disclosure, when the UE enters the idle state over the N3GPP access, the network does not activate the user plane resource corresponding to the N3GPP access, which can save signaling.

Figure 7:
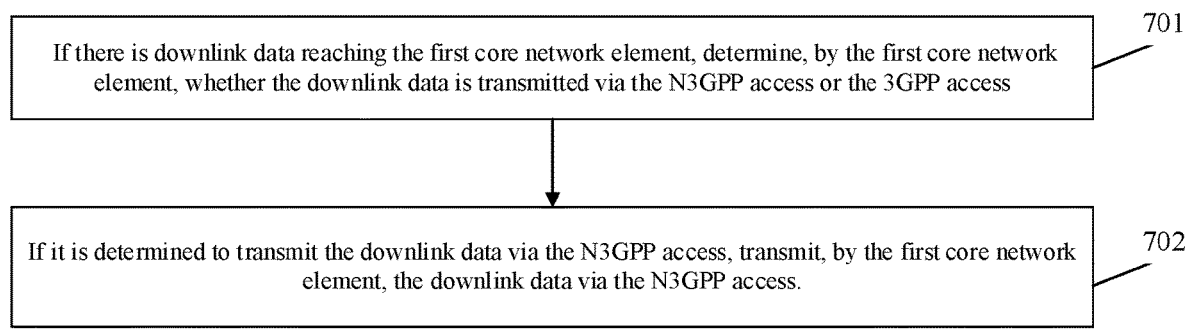
FIG. 7 is a flowchart of an information transmission method according to an embodiment of the present disclosure.

FIG. 7 is a schematic diagram showing processes of the information transmission method according to an embodiment of the present disclosure. As shown in FIG. 7, the information transmission method includes the following steps.

In step 701, if there is downlink data reaching the first core network element, the first core network element determines whether the downlink data is transmitted via the N3GPP access or the 3GPP access.

In an embodiment, the first core network element is a second UPF.

In the non-roaming scenario, the second UPF is PSA UPF.

In the home route roaming scenario, the second UPF is V-UPF. Here, the downlink data reaches the H-UPF first, and the H-UPF forwards the downlink data to the V-UPF via a N9 interface, so that the downlink data reaches the V-UPF.

In embodiments of the present disclosure, the first core network element determines the access through which downlink data needs to be transmitted according to the N4 Rule, local configuration, measurement information, etc. For example, if the priority of the N3GPP access is higher than the priority of the 3GPP access, the downlink data needs to be transmitted via the N3GPP access.

In step 702, if it is determined to transmit the downlink data via the N3GPP access, the first core network element transmits the downlink data via the N3GPP access.

If the first core network element transmits the downlink data via the N3GPP access, the user plane resource corresponding to the N3GPP access need to be activated. The following describes how to activate the user plane resource corresponding to the N3GPP access in different scenarios.

In the non-roaming scenario, the second UPF is PSA UPF, and the second SMF is H-SMF. 1) If the user plane resource corresponding to the N3GPP access is deactivated, the second UPF sends a downlink notification message to the second SMF, and the downlink notification message carries the first session identifier and the access type; 2) the second UPF sends a second message (such as the N1N2Message Transfer message) to the AMF, and the second message carries the first session identifier and the access type; 3) after the AMF determines that the terminal is in the idle state over the N3GPP access, the AMF notifies the terminal via the 3GPP access; the terminal determines whether the current N3GPP access is available, and if the current N3GPP access is available, the terminal initiates the service request procedure via the N3GPP access; 4) after the service request procedure is completed, the second UPF sends the downlink data to the terminal via the N3GPP access. It should be noted that the first session identifier refers to the session identifier corresponding to the downlink data to be transmitted. The access type is, for example, Access Type=N3GPP.

According to some embodiments, if the current N3GPP access is unavailable, the terminal notifies the AMF on the 3GPP access that the current N3GPP access is unavailable; the AMF notifies the second SMF that the current N3GPP access is unavailable; the second SMF notifies the second UPF that the current N3GPP access is unavailable. Further, when notifying that the current N3GPP access is unavailable, the notification message may also carry the access type (for example, Access Type=N3GPP).

In the home route roaming scenario, the second UPF is V-UPF, the second SMF is V-SMF, the first UPF is H-UPF, and the first SMF is H-SMF. 1) If the user plane resource corresponding to the N3GPP access is deactivated, the second UPF sends a downlink notification message to the second SMF, and the downlink notification message carries the first session identifier and the access type; 2) the second UPF sends a second message (such as the N1N2Message Transfer message) to the AMF, and the second message carries the first session identifier and the access type; 3) after the AMF determines that the terminal is in the idle state over the N3GPP access, the AMF notifies the terminal via the 3GPP access; the terminal determines whether the current N3GPP access is available, and if the current N3GPP access is available, the terminal initiates the service request procedure via the N3GPP access; 4) after the service request procedure is completed, the second UPF sends the downlink data to the terminal via the N3GPP access. It should be noted that the first session identifier refers to the session identifier corresponding to the downlink data to be transmitted. The access type is, for example, Access Type=N3GPP.

According to some embodiments, if the current N3GPP access is unavailable, the terminal notifies the AMF on the 3GPP access that the current N3GPP access is unavailable; the AMF notifies the second SMF that the current N3GPP access is unavailable; the second SMF notifies the first SMF that the current N3GPP access is unavailable; the first SMF notifies the first UPF that the current N3GPP access is unavailable. Further, when notifying that the current N3GPP access is unavailable, the notification message may also carry the access type (for example, Access Type=N3GPP).

In embodiments of the present disclosure, after the terminal enters the connected state over the N3GPP access, the terminal notifies the first core network element in the following manner: the first core network element receives a third message, and the third message is used for notifying the first core network element that N3GPP access is available or that the terminal is in the connected state over the N3GPP access.

In embodiments of the present disclosure, the first core network element receiving the third message may be implemented using at least one of the following methods.

Method 1: The third message is sent by the terminal to the first UPF. Here, the first UPF is PSA UPF.

Method 2: The third message is sent to the first UPF by the first SMF.

In the non-roaming scenario, the first UPF is PSA UPF, and the first SMF is H-SMF. Before the third message is sent by the first SMF to the first UPF, the AMF notifies the first SMF that the terminal is in the connected state over the N3GPP access.

In the local breakout roaming scenario, the first UPF is PSA UPF, and the first SMF is V-SMF. Before the third message is sent by the first SMF to the first UPF, the AMF notifies the first SMF that the terminal is in the connected state over the N3GPP access.

In the home route roaming scenario, the first UPF is H-UPF, the first SMF is H-SMF, the second UPF is V-UPF, and the second SMF is V-SMF. Before the third message is sent by the first H-SMF to the first UPF, the AMF notifies the second SMF that the terminal is in the connected state over the N3GPP access; and the second SMF notifies the first SMF that the terminal is in the connected state over the N3GPP access.

The following describes the detailed processes of the above technical solutions.

Figure 8:
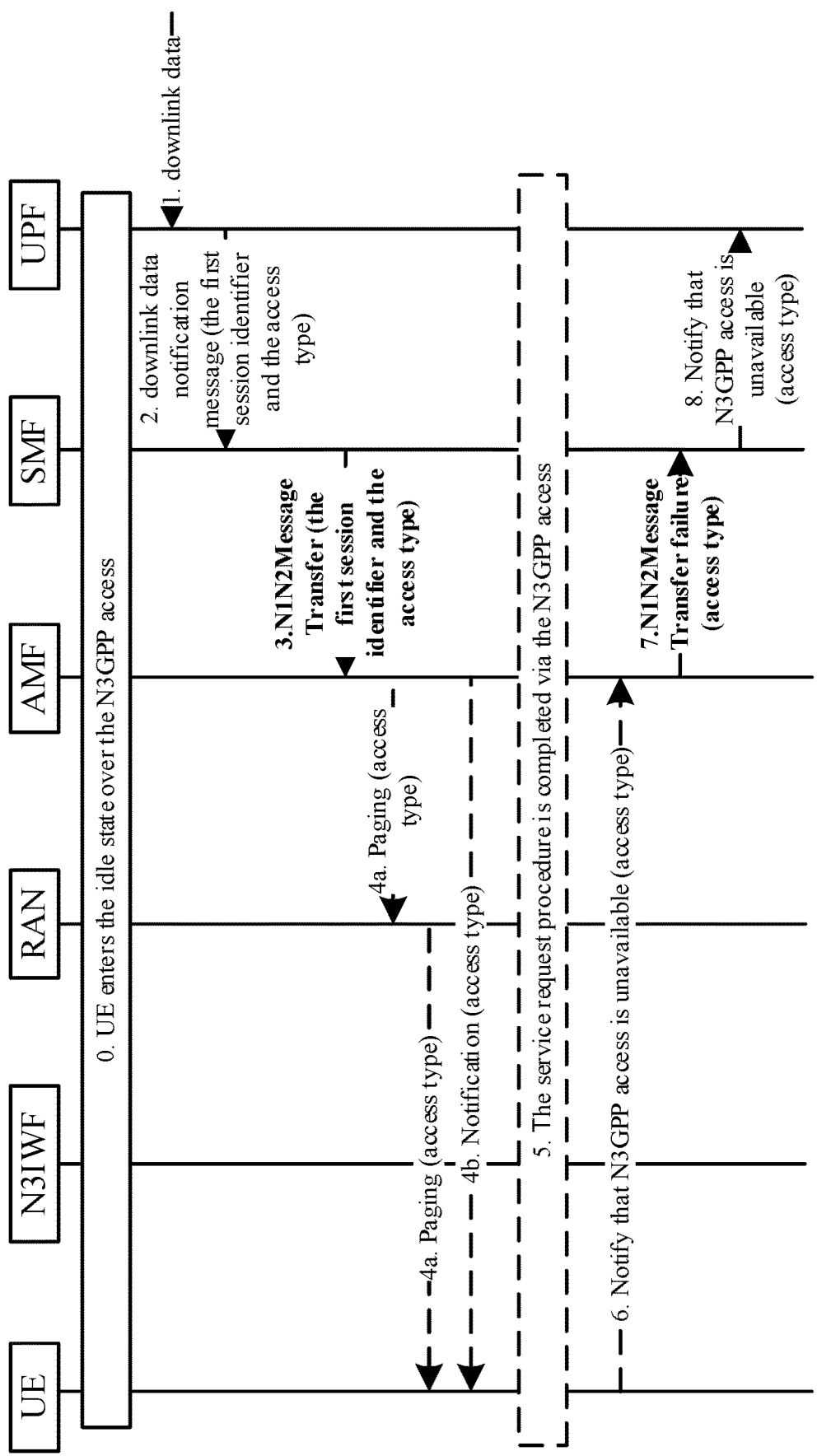
FIG. 8 is a schematic diagram showing processes of an information transmission method according to an embodiment of the present disclosure.

FIG. 8 is a flowchart of the information transmission method according to an embodiment of the present disclosure. As shown in FIG. 8, the information transmission method includes the following steps.

In step 0, the UE enters the idle state over the N3GPP access.

The UE is registered with the core network via the 3GPP access and N3GPP access in advance, and can be registered with the same PLMN or different PLMNs: for the same PLMN, there is only one AMF; for different PLMNs, each access has an AMF.

In step 1, downlink data reaches the UPF.

In step 2, the UPF sends a downlink data notification message to the SMF, and the downlink data notification message carries the first session identifier and the access type.

Here, the UPF determines the access through which the downlink data is to be transmitted, according to the N4 Rule, the local configuration, or the measurement information, etc. For example, if the priority of the N3GPP access is higher than the priority of the 3GPP access, the downlink data needs to be transmitted via the N3GPP access. Further, if the user plane resource corresponding to the 3GPP access is deactivated, the UPF sends a downlink data notification message to the SMF. The downlink data notification message includes the first session identifier and Access Type=N3GPP.

For the home routed roaming scenarios, the UPF is V-UPF and the SMF is V-SMF.

For the non-roaming scenarios, the UPF is H-UPF and the SMF is H-SMF.

In step 3, the SMF sends an N1N2Message Transfer message to the AMF. The N1N2Message Transfer message carries the first session identifier and the access type.

Here, the access type is, for example, Access Type=N3GPP.

For the home routed roaming scenario, the SMF is V-SMF, and the N1N2Message Transfer message also contains the N2 SM Message sent to the N3IWF.

For the non-roaming scenario, the SMF is H-SMF, and the N1N2Message Transfer message also includes the N2 SM Message sent to the RAN.

In step 4a, the AMF initiates paging to the UE via the RAN, and the paging carries the access type.

Here, the access type is, for example, Access Type=N3GPP.

In step 4b, the AMF sends a notification message to the UE, and the notification message carries the access type.

Here, the access type is, for example, Access Type=N3GPP.

It should be noted that one of the above steps 4a and 4b is performed. Specifically, when the UE is in the idle state over the N3GPP access, step 4a is performed; when the UE is in the connected state over the N3GPP access, step 4b is performed.

In step 5, the service request procedure is completed via the N3GPP access.

Specifically, the UE determines whether the current N3GPP access is available (for example, whether the UE is within the WLAN coverage), and if the current N3GPP access is available, the UE initiates a service request procedure via the N3IWF.

In step 6, the UE sends a notification message to the AMF. The notification message is used to notify that N3GPP access is unavailable. Optionally, the notification message carries the access type.

Specifically, if the current N3GPP access is unavailable, the UE sends a notification message to the AMF via the 3GPP access to notify the AMF that the current N3GPP access is unavailable. Optionally, the UE may carry the access type in the notification message sent to the AMF. Here, the access type is, for example, Access Type=N3GPP.

In step 7, the AMF sends an N1N2Message Transfer failure message to the SMF. The N1N2Message Transfer failure message is used to notify that the N3GPP access is unavailable. Optionally, the notification message carries the access type.

Here, the access type is, for example, Access Type=N3GPP.

For the non-roaming scenarios, the SMF is H-SMF.

For the home routed roaming scenario, the SMF is V-SMF.

In step 8, the SMF sends a notification message to the UPF. The notification message is used to notify that the N3GPP access is unavailable. Optionally, the notification message carries the access type.

For the non-roaming scenario, the UPF is H-UPF, the SMF is H-SMF, the H-SMF gives up activating the user plane resource corresponding to N3GPP access, and sends a notification message to the H-UPF. The notification message is used to notify that the N3GPP access is not available. Optionally, the notification message carries the access type.

Here, the access type is, for example, Access Type=N3GPP.

For the home routed roaming scenario, the UPF is V-UPF, the SMF is V-SMF, the V-SMF gives up activating the user plane resource corresponding to the N3GPP access, and sends a notification message to the H-SMF, and H-SMF sends a notification message to the H-PUF. The notification message is used to notify that N3GPP access is not available. Optionally, the notification message carries the access type. Here, the access type is, for example, Access Type=N3GPP.

Later, when N3GPP access becomes available (for example, the UE moves into the WLAN coverage area), the UE transmits data via the N3GPP access, and then steps 10a to 10c in FIG. 6 can be reused to notify the UPF that the current N3GPP access is available.

It should be noted that the above steps 5 and (6+7+8) belong to two parallel processes, and there is no restriction on the sequence of the steps.

In the technical solutions of embodiments of the present disclosure, for the MA PDU session, the access for which the user plane resource needs to be activated is clarified. If it is necessary to activate the user plane resource corresponding to the N3GPP access, the network triggered user plane resource activation is implemented over the N3GPP access.

Figure 9:
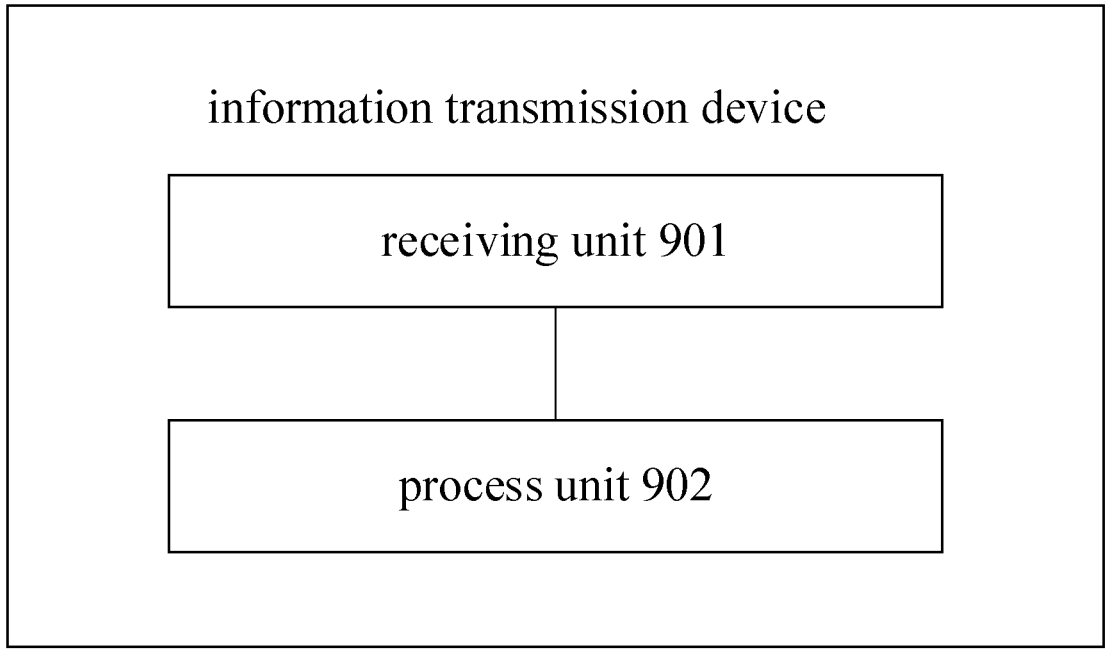
FIG. 9 is a schematic diagram showing the structural composition of an information transmission device according to an embodiment of the present disclosure.

FIG. 9 is a schematic diagram showing the structural composition of an information transmission device according to an embodiment of the present disclosure. The information transmission device is applied to a first network element. The device includes a receiving unit 901 and a process unit 902.

The receiving unit 901 is configured to receive a first message, wherein the first message is used to notify the first core network element that a N3GPP access is unavailable or that a terminal is in an idle state over the N3GPP access.

The process unit 902 is configured to, if there is downlink data arriving at the first core network element, transmit the downlink data via a 3GPP access, or discarding the downlink data, or delaying transmission of the downlink data.

According to an embodiment, the first core network element is a first UPF; and the first message is sent by the terminal to the first UPF.

According to an embodiment, the first core network element is a first UPF; the first message is sent by a first SMF to the first UPF.

According to an embodiment, before the first message is sent by the first SMF to the first UPF, an AMF notifies the first SMF that the terminal is in the idle state over the N3GPP access.

According to an embodiment, before the first message is sent by the first SMF to the first UPF, an AMF notifies a second SMF that the terminal is in the idle state over the N3GPP access, and the second SMF notifies the first SMF that the terminal is in the idle state over the N3GPP access.

According to an embodiment, the process unit is configured to: based on a first policy, determine whether to transmit the downlink data via the 3GPP access, discard the downlink data, or delay transmission of the downlink data.

According to an embodiment, the first policy comes locally from the first core network element; or, the first policy comes from a PCF.

According to an embodiment, the first core network element is a first UPF; the process unit 902 is configured to: if a user plane resource corresponding to the 3GPP access is deactivated, send a downlink data notification message to a first SMF, the downlink data notification message carrying a first session identifier; the first SMF determines, based on the downlink data notification message, that the user plane resource corresponding to the 3GPP access needs to be activated; the first SMF sends a second message to an AMF, the second message carries the first session identifier and the AMF determines, based on the second message, that it is needed to perform a service request procedure via the 3GPP access; and after the service request procedure is completed, the process unit sends the downlink data to the terminal via the 3GPP access.

According to an embodiment, the first core network element is a first UPF; the process unit 902 is configured to send the downlink data to a second UPF; if a user plane resource corresponding to the 3GPP access is deactivated, the second UPF sends a downlink data notification message to the second SMF, the downlink data notification message carries a first session identifier, the second SMF determines, based on the downlink data notification message, that the user plane resource corresponding to the 3GPP access needs to be activated; the second SMF sends a second message to an AMF, the second message carries the first session identifier, and the AMF determines, based on the second message, that it is needed to perform a service request procedure via the 3GPP access; after the service request procedure is completed, the second UPF sends the downlink data to the terminal via the 3GPP access.

According to an embodiment, the receiving unit 901 is further configured to receive a third message, wherein the third message is used to notify the first core network element that the N3GPP access is available or that the terminal is in a connected state over the N3GPP access.

According to an embodiment, the first core network element is a first UPF; and the third message is sent by the terminal to the first UPF.

According to an embodiment, the first core network element is a first UPF; and the third message is sent by a first SMF to the first UPF.

According to an embodiment, before the third message is sent by the first SMF to the first UPF, an AMF notifies the first SMF that the terminal is in the connected state over the N3GPP access.

According to an embodiment, before the third message is sent by a first H-SMF to the first UPF, an AMF notifies a second SMF that the terminal is in the connected state over the N3GPP access, and the second SMF notifies the first SMF that the terminal is in the connected state over the N3GPP access.

Those skilled in the art should understand that detailed descriptions of the information transmission device according to embodiments of the present disclosure can be found in the previous descriptions regarding the method embodiments.

Figure 10:
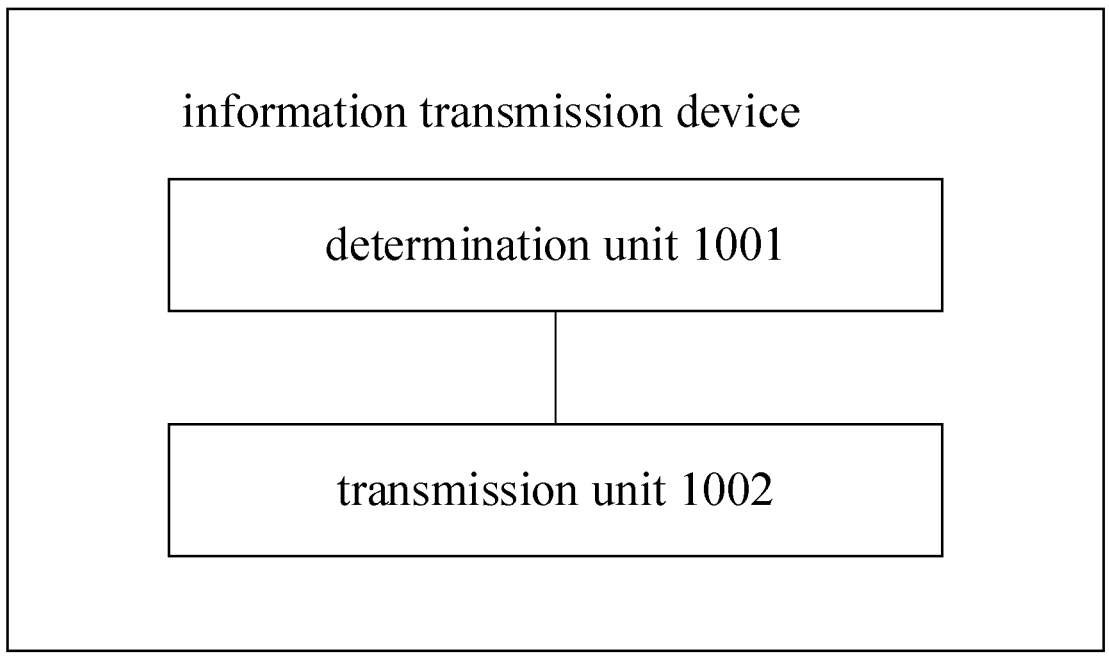
FIG. 10 is a schematic diagram showing the structural composition of an information transmission device according to an embodiment of the present disclosure.

FIG. 10 is a schematic diagram showing the structural composition of an information transmission device according to an embodiment of the present disclosure. The information transmission device is applied to a first core network element. The information transmission device includes a determination unit 1001 and a transmission unit 1002.

The determination unit 1001 is configured to, if there is downlink data arriving at the first core network element, determine whether to transmit the downlink data via a N3GPP access or a 3GPP access.

The transmission unit 1002 is configured to, if it is determined to transmit the downlink data via the N3GPP access, transmit the downlink via the N3GPP access.

According to an embodiment, the first core network element is a second UPF; the transmission unit 1001 is configured to send a downlink notification message to a second SMF, the downlink notification message carrying a first session identifier and an access type; the second SMF sends a second message to an AMF, and the second message carries the first session identifier and the access type; if the AMF determines that a terminal is in an idle state over the N3GPP access, the AMF notifies the terminal via the 3GPP access; the terminal determines whether the N3GPP access is currently available, and if the N3GPP access is currently available, the terminal initiates a service request procedure via the N3GPP access; and after the service request procedure is completed, the transmission unit send the downlink data to the terminal via the N3GPP access.

According to an embodiment, if the N3GPP access is currently not available, the terminal notifies the AMF over the 3GPP access that the N3GPP access is currently not available; the AMF notifies the second SMF that the N3GPP access is currently not available; and the second SMF notifies the second UPF that the N3GPP access is currently not available.

According to an embodiment, if the N3GPP access is currently not available, the terminal notifies the AMF over the 3GPP access that the N3GPP access is currently not available; the AMF notifies the second SMF that the N3GPP access is currently not available; the second SMF notifies a first SMF that the N3GPP access is currently not available; and the first SMF notifies a first UPF that the N3GPP access is currently not available.

According to an embodiment, the device further includes a receiving unit (not shown) configured to receive a third message, wherein the third message is used to notify the first core network element that the N3GPP access is available or that a terminal is in a connected state over the N3GPP access.

According to an embodiment, the first core network element is a first UPF; and the third message is sent by the terminal to the first UPF.

According to an embodiment, the first core network element is a first UPF; and the third message is sent by a first SMF to the first UPF.

According to an embodiment, before the third message is sent by the first SMF to the first UPF, an AMF notifies the first SMF that the terminal is in the connected state over the N3GPP access.

According to an embodiment, before the third message is sent by a first H-SMF to the first UPF, an AMF notifies a second SMF that the terminal is in the connected state over the N3GPP access, and the second SMF notifies the first SMF that the terminal is in the connected state over the N3GPP access.

Those skilled in the art should understand that detailed descriptions of the information transmission device according to embodiments of the present disclosure can be found in the previous descriptions regarding the method embodiments.

Figure 11:
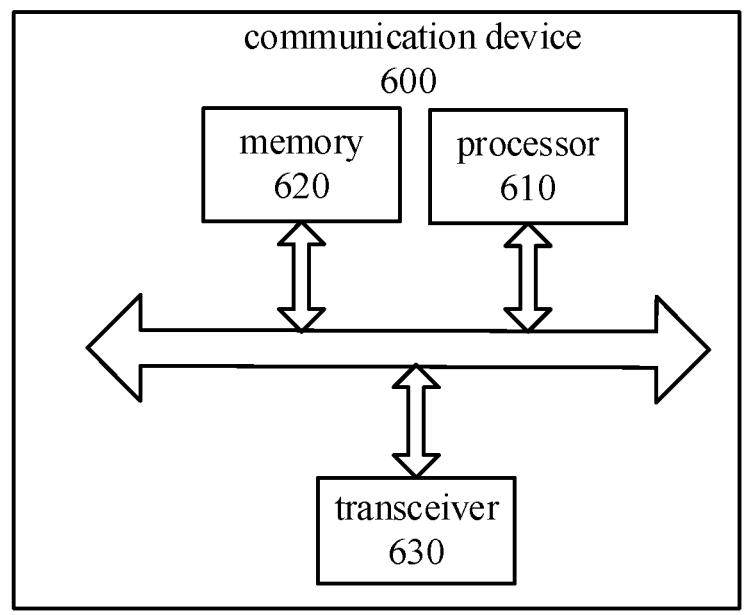
FIG. 11 is a schematic structural diagram of a communication device according to an embodiment of the present disclosure.

FIG. 11 is a schematic structural diagram of a communication device 600 according to an embodiment of the present disclosure. The communication device may be a network device, such as a UPF. The communication device 600 shown in FIG. 11 includes a processor 610, and the processor 610 may call and run a computer program from a memory to perform the method in embodiments of the present disclosure.

According to embodiments, as shown in FIG. 11, the communication device 600 may further include a memory 620. The processor 610 may call and run a computer program from the memory 620 to perform the method in embodiments of the present disclosure.

The memory 620 may be a separate device independent of the processor 610, or may be integrated in the processor 610.

According to embodiments, as shown in FIG. 11, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may specifically be the network device in embodiments of the present disclosure, and the communication device 600 may implement the corresponding processes implemented by the network device in the method embodiments of the present disclosure. For brevity, details are not repeated here.

According to embodiments, the communication device 600 may specifically be a mobile terminal/a terminal according to an embodiment of the present disclosure, and the communication device 600 may implement the corresponding processes implemented by the mobile terminal/terminal in the method embodiments of the present disclosure. For brevity, details are not repeated here.

Figure 12:
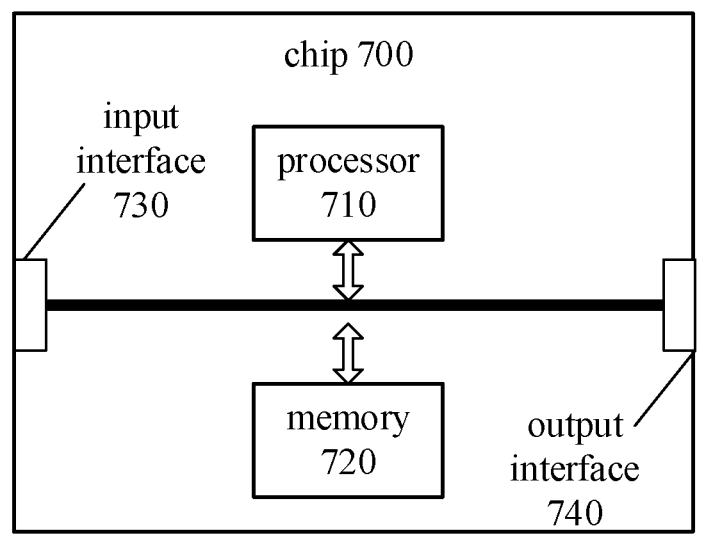
FIG. 12 is a schematic structural diagram of a chip according to an embodiment of the present disclosure.

FIG. 12 is a schematic structural diagram of a chip according to an embodiment of the present disclosure. The chip 700 shown in FIG. 12 includes a processor 710, and the processor 710 can call and run a computer program from a memory to implement the method according to embodiments of the present disclosure.

According to embodiments, as shown in FIG. 12, the chip 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the chip 700 may further include an input interface 730. The processor 710 may control the input interface 730 to communicate with other devices or chips, and specifically, the process 710 can control the input interface to obtain information or data sent by other devices or chips.

According to embodiments, the chip 700 may further include an output interface 740. The processor 710 can control the output interface 740 to communicate with other devices or chips, and specifically, the processor 710 can control the output interface 740 to output information or data to other devices or chips.

According to embodiments, the chip can be applied to the network device in embodiments of the present disclosure, and the chip can implement the corresponding process implemented by the network device in various methods according to embodiments of the present disclosure. For brevity, details are not repeated herein again.

According to embodiments, the chip can be applied to the mobile terminal/terminal in embodiments of the present disclosure, and the chip can implement the corresponding process implemented by the mobile terminal/terminal in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 13:
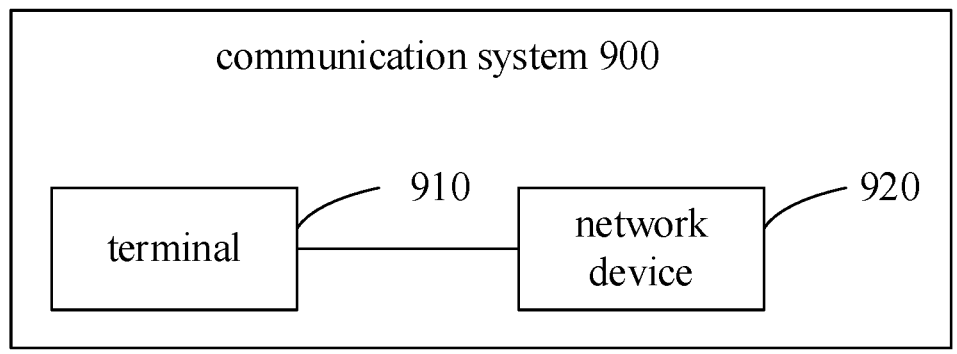
FIG. 13 is a schematic block diagram of a communication system according to an embodiment of the present disclosure.

FIG. 13 is a schematic block diagram of a communication system 900 according to an embodiment of the present disclosure. As shown in FIG. 13, the communication system 900 includes a terminal 910 and a network device 920.

The terminal 910 may be used to implement the corresponding functions implemented by the terminal in the foregoing methods, and the network device 920 may be used to implement the corresponding functions implemented by the network device in the foregoing methods. For brevity, details are not repeated herein again.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal in embodiments of the present disclosure, and the computer programs cause a computer to perform the corresponding processes implemented by the mobile terminal/terminal in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal in embodiments of the present disclosure, and the computer program instructions cause a computer to perform the corresponding processes implemented by the mobile terminal/terminal in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal in embodiments of the present disclosure, and when the computer program runs on a computer, the computer is caused to perform the corresponding processes implemented by the mobile terminal/terminal in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for information transmission, comprising:
    notifying, by an Access and Mobility Management Function (AMF), a first Session Management Function (SMF) that a terminal, which is registered with both a 3GPP access and an N3GPP access, is in an idle state over the N3GPP access;

receiving, by a first User Plane Function (UPF) from the first SMF, a first message, wherein the first message is used to notify the first UPF that the N3GPP access is unavailable; and if there is downlink data arriving at the first UPF, transmitting, by the first UPF, the downlink data via the 3GPP access, discarding the downlink data, or delaying transmission of the downlink data;

in response to determining, by the first UPF based on a first policy locally from the first UPF, to transmit the downlink data via the 3GPP access and in response to a user plane resource corresponding to the 3GPP access being deactivated, sending, by the first UPF, a downlink data notification message to the first SMF, the downlink data notification message carrying a first session identifier, wherein the first SMF determines, based on the downlink data notification message, that the user plane resource corresponding to the 3GPP access needs to be activated;

sending, by the first SMF, a second message to an AMF, the second message carrying the first session identifier, wherein the AMF determines, based on the second message, that it is needed to perform a service request procedure via the 3GPP access; and after the service request procedure is completed, sending, by the first UPF, the downlink data to the terminal via the 3GPP access.

2. The method according to claim 1, further comprising: receiving, by the first UPF, a third message, wherein the third message is used to notify the first UPF that the N3GPP access is available or that the terminal is in a connected state over the N3GPP access.

3. A device for information transmission, applied to a first User Plane Function (UPF), comprising:
a memory for storing computer programs;
a transceiver; and
a processor, wherein the processor is configured to execute the computer programs to:

control the transceiver to receive a first message from a first Session Management Function (SMF), wherein the first SMF is notified by Access and Mobility Management Function AMF that a terminal, which is registered with both a 3GPP access and an N3GPP access, is in an idle state over the N3GPP access, wherein the first message is used to notify the first UPF that the N3GPP access is unavailable; and if there is downlink data arriving at the first UPF, transmit the downlink data via the 3GPP access, discard the downlink data, or delay transmission of the downlink data;

in response to determine, based on a first policy locally from the first UPF, to transmit the downlink data via the 3GPP access and in response to a user plane resource corresponding to the 3GPP access being deactivated, send a downlink data notification message to the first SMF, the downlink data notification message carrying a first session identifier, wherein the first SMF determines, based on the downlink data notification message, that the user plane resource corresponding to the 3GPP access needs to be activated;

wherein the first SMF sends a second message to an AMF, the second message carrying the first session identifier, wherein the AMF determines, based on the second message, that it is needed to perform a service request procedure via the 3GPP access; and after the service request procedure is completed, the first UPF sends the downlink data to the terminal via the 3GPP access.

4. The device claim 3, wherein the processor is configured to execute the computer programs to: receive a third message, wherein the third message is used to notify the first UPF that the N3GPP access is available or that the terminal is in a connected state over the N3GPP access.

* * * * *